(12) United States Patent
Ohnishi (10) Patent No.: US 9,683,116 B2
(45) Date of Patent: Jun. 20, 2017

(54) PRODUCTION METHOD FOR PAINTED HEAT-RESISTANT MEMBER, PRINTING DEVICE, AND INK

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/901,074

(22) PCT Filed: Jun. 26, 2014

(86) PCT No.: PCT/JP2014/067074
§ 371 (c)(1),
(2) Date: Dec. 28, 2015

(87) PCT Pub. No.: WO2014/208702
PCT Pub. Date: Dec. 31, 2014

(65) Prior Publication Data
US 2016/0312050 A1    Oct. 27, 2016

(30) Foreign Application Priority Data

Jun. 27, 2013  (JP) .................. 2013-134991

(51) Int. Cl.
*B41J 2/335*      (2006.01)
*B41J 2/21*       (2006.01)
(Continued)

(52) U.S. Cl.
CPC ............... *C09D 11/101* (2013.01); *B41J 2/01* (2013.01); *B41M 5/007* (2013.01);
(Continued)

(58) Field of Classification Search
CPC ...... B41J 2/3353; B41J 2/2107; C09D 11/101
See application file for complete search history.

(56) References Cited

U.S. PATENT DOCUMENTS 6,471,896 B1 *  10/2002  Katsuki .................. B41J 3/4078
                                          264/132
2005/0068410 A1 *  3/2005  Kama ........................ B41J 2/32
                                          347/223
2010/0098952 A1    4/2010  Yeong et al.

FOREIGN PATENT DOCUMENTS

EP          1928963         3/2012
JP          S61261248       11/1986
                (Continued)

OTHER PUBLICATIONS

"Search Report of Euorpe Counterpart Application", issued on Jun. 20, 2016, p. 1-p. 14.
(Continued)

*Primary Examiner* — Jason Uhlenhake
(74) *Attorney, Agent, or Firm* — Jianq Chyun IP Office (57) ABSTRACT

Disclosed herein is a way to appropriately decorate a heat-resistant member. This is achieved by a method for producing a painted heat-resistant member which is a heat-resistant member having an image drawn thereon. The method includes a drawing step of ejecting an ink onto a heat-resistant member medium in droplets with an inkjet head, and irradiating the ink landed on the medium with UV light to draw an image on the medium, the ink containing at least a pasty liquid containing an organic substance, an UV-polymerizable organic substance which is an organic substance that polymerizes upon being irradiated with UV light, and an inorganic pigment dispersed in the pasty liquid; and an organic substance removal step of heating the medium
(Continued)

having the image drawn thereon to remove the organic substance component contained in the ink on the medium.

14 Claims, 3 Drawing Sheets

(51) Int. Cl.
    *C09D 11/101*      (2014.01)
    *B41M 5/00*      (2006.01)
    *B41M 7/00*      (2006.01)
    *C04B 41/86*      (2006.01)
    *C04B 41/00*      (2006.01)
    *C04B 41/50*      (2006.01)
    *C09D 11/322*      (2014.01)
    *C03C 17/02*      (2006.01)
    *B41J 2/01*      (2006.01)

(52) U.S. Cl.
    CPC ........ *B41M 5/0047* (2013.01); *B41M 7/0081* (2013.01); *C03C 17/02* (2013.01); *C04B 41/009* (2013.01); *C04B 41/5022* (2013.01); *C04B 41/86* (2013.01); *C09D 11/322* (2013.01); *C03C 2217/72* (2013.01); *C03C 2218/119* (2013.01)

(56) References Cited

FOREIGN PATENT DOCUMENTS

| | | |
|---|---|---|
| JP | H0459683 | 2/1992 |
| JP | 2001-152063 | 6/2001 |
| JP | 2002-356388 | 12/2002 |
| JP | 2009-96962 | 5/2009 |
| WO | 0132789 | 5/2001 |

OTHER PUBLICATIONS

"International Search Report (Form PCT/ISA/210) of PCT/JP2014/067074", mailed on Sep. 30, 2014, with English translation thereof, pp. 1-6.

"Office Action of Japan Counterpart Application" with English translation thereof, issued on Dec. 13, 2016, p. 1-p. 8.

* cited by examiner

PRODUCTION METHOD FOR PAINTED HEAT-RESISTANT MEMBER, PRINTING DEVICE, AND INK

CROSS-REFERENCE TO RELATED APPLICATION

This application is a 371 of international application of PCT application serial no. PCT/JP2014/067074, filed on Jun. 26, 2014, which claims the priority benefit of Japan application no. JP 2013-134991, filed on Jun. 27, 2013. The entirety of each of the above-mentioned patent applications is hereby incorporated by reference herein and made a part of this specification.

TECHNICAL FIELD

The present invention relates to a method for producing a painted heat-resistant member, and to a printing device, and an ink.

BACKGROUND ART

Heat-resistant members such as earthenware, glass, and ceramics have been decorated with the use of, for example, an underglaze color that paints these materials underneath a high-temperature glaze (glaze). The underglaze color is a paint for forming a colored oxide coating, and is typically emulsified with a glue from fats of animals (such as deer, and rabbits) to improve glaze viscosity. The underglaze color paint is heated to vitrify at about 1000° C. It has become common to use an inkjet printer for printing image on various media. For example, there are studies to decorate glass or other such products by printing with an UV ink (UV curable ink) according to the inkjet scheme.

PRIOR ART DOCUMENT

Patent Document

Patent Document 1: JP-A-2002-356388

SUMMARY OF THE INVENTION

Problem to be Solved by the Invention

An inkjet printer ejects micro ink droplets through inkjet head nozzles to perform high-resolution printing. The present inventor has thought to draw a high-resolution image by forming an underglaze color image using the inkjet scheme. However, the viscosity of an underglaze color is higher than the viscosity that can be ejected through nozzles by the inkjet scheme. It is accordingly difficult to directly use an underglaze color for inkjet printing.

It may be possible to, for example, dilute an underglaze color to lower viscosity. However, simply lowering the viscosity of an underglaze color causes the color to bleed upon landing on a medium (such as earthenware), and lowers the image quality. Another problem of lowering the viscosity of an underglaze color is that the glass or other components of the underglaze color settle in the liquid. It is accordingly also difficult to appropriately perform printing with this method.

It might be possible to use, for example, an UV ink to print a medium, instead of using an underglaze color. However, simply using an UV ink for printing may not be sufficient to obtain required properties, for example, such as durability, and scratch resistance. This has created a need for a method that can be used to appropriately decorate heat-resistant members such as earthenware. It is accordingly an object of the present invention to provide a painted heat-resistant member producing method, a printing device, and an ink as a solution to the foregoing problems.

A search for related art documents having relevance to the present invention found a report concerning a method that uses a hot melt ink to form an ink image, and transfers the image to produce painted earthenware (Patent Document 1). This method forms an inorganic pigment image by transferring an ink image through a corresponding transfer layer. The inorganic pigment image is then sintered onto a pottery surface under heat. However, the method involves a complicated procedure as it requires the coloring step with an ink, and the transfer step. There is accordingly a need for a method that can more easily and appropriately decorate heat-resistant members such as earthenware (pottery) than, for example, methods of related art such as above.

Solutions to the Problem

The present invention has the following configurations as a solution to the foregoing problems.

(Configuration 1) A method for producing a painted heat-resistant member which is a heat-resistant member having an image drawn thereon, the method including: a drawing step of ejecting an ink onto a heat-resistant member in droplets with an inkjet head, and irradiating the ink landed on the heat-resistant member with UV light to draw an image on the heat-resistant member, the ink containing at least a pasty liquid containing an organic substance, an UV-polymerizable organic substance which is an organic substance that polymerizes upon being irradiated with UV light, and an inorganic pigment dispersed in the pasty liquid; and an organic substance removal step of heating the heat-resistant member having the image drawn thereon to remove the organic substance component contained in the ink on the heat-resistant member.

The organic substance removal step removes the organic substance component contained in the ink by, for example, burning the organic substance component under heat. In the organic substance removal step of the configuration above, the organic substance component removed include, for example, at least the pasty liquid and the UV-polymerizable organic substance contained in the ink. The language "draw an image on the heat-resistant member" means, for example, drawing characters, pictures, or the like on the heat-resistant member. With the foregoing configuration, it is possible to appropriately draw a high-resolution image by, for example, directly drawing an image on the heat-resistant member with the inkjet head.

With the foregoing configuration, the inorganic pigment can be uniformly dispersed in the ink by, for example, dispersing the inorganic pigment in the pasty liquid. With this configuration, it is possible therefore to, for example, appropriately draw an image with the ink containing the inorganic pigment.

With the foregoing configuration, the viscosity of the ink on the heat-resistant member can be increased by irradiating the ink that has landed on the heat-resistant member with UV light, even when the ink is a low-viscosity ink that is ejectable according to the inkjet scheme. With this configuration, it is possible to, for example, appropriately prevent the ink from bleeding upon landing.

With the foregoing configuration, the pasty liquid remains after the UV irradiation, and the ink does not completely cure even after the UV irradiation. Conceivably, this allows the ink dots to, for example, gradually spread and flatten over time. With this configuration, there accordingly will be no granularity remaining in ink dots and producing a matte image, for example, even when the ink is irradiated with UV light immediately after it has landed in droplets.

With the foregoing configuration, the UV-polymerizable organic substance is used not to completely cure the ink, but to increase the ink viscosity and prevent bleeding, as described above. The content of the UV-polymerizable organic substance can thus be more appropriately reduced than when, for example, the ink is completely cured by UV irradiation. This further improves the ink safety, for example, even when substances, such as monomers, that are harmful to human body are used as the UV-polymerizable organic substance. With the foregoing configuration, the organic substance component in the ink is removed in the organic substance removal step. This eliminates the problem of residual uncured monomer or the like when substances such as monomers are used as the UV-polymerizable organic substance.

With the foregoing configuration, the inorganic pigment or the like among the ink components only remains on the heat-resistant member after the removal of the organic substance component. The drawn image can thus have desirable properties such as durability and scratch resistance as with the case of, for example, drawing an image on earthenware or the like with an underglaze color. Further, because an image can be directly drawn on the heat-resistant member with the inkjet head, it is not required to provide additional steps, for example, such as transfer. With the foregoing configuration, it is therefore possible to, for example, desirably decorate the heat-resistant member.

As used herein, "heat-resistant member" is, for example, a member that can be heated to temperatures of 400° C. and more. Specifically, the heat-resistant member may be, for example, earthenware (pottery) or porcelain. The heat-resistant member may be, for example, any of exterior materials such as tiles, bricks, clay tiles, and stones, or pavement materials. The heat-resistant member also may be any of materials used for painting, for example, such as glass, ceramic, vitreous enamel, and cloisonné. The heat-resistant member also may be, for example, any of various heat-resistant containers and chemical-resistant containers. The painted heat-resistant member producing method of the configuration above can be suitably used for drawing on, for example, name plates, tombs, traffic signs, outdoor maps, and information maps.

In the organic substance removal step, for example, the heat-resistant member is heated with an oven or the like in air at 400° C. or more (for example, about 400° C. to 500° C.). With this configuration, for example, the organic substance component in the ink can be appropriately removed by being burnt. The heating temperature may be, for example, 500° C. or more (for example, about 500° C. to 1000° C.). In the organic substance removal step, for example, the heat-resistant member may be heated with a kiln such as a pottery kiln.

(Configuration 2) In the drawing step, the ink landed on the heat-resistant member is irradiated with UV light to polymerize the UV-polymerizable organic substance, and the viscosity of the ink is increased to a level that prevents the ink from bleeding on the heat-resistant member. With this configuration, it is possible to, for example, appropriately prevent the ink from bleeding on the heat-resistant member. It is also possible to, for example, more appropriately decorate the heat-resistant member.

Concerning ink viscosity, a viscosity that prevents bleeding is, for example, a viscosity that does not cause bleeding that poses a problem in the accuracy of the drawn image. More specifically, a viscosity that prevents bleeding is, for example, 20 mPa·sec (25° C. room temperature) or more, preferably 100 mPa·sec (25° C. room temperature) or more.

(Configuration 3) The ink further contains a glaze, and the organic substance removal step heats the heat-resistant member to a temperature equal to or greater than the melting point of the glaze. The glaze is, for example, a liquid containing a glass component. The glaze may be, for example, a liquid having the same or similar components as glazes (varnishes) used to produce, for example, earthenware and porcelain. A temperature equal to or greater than the melting point of the glaze is, for example, about 500° C. to 1200° C., more preferably about 500° C. to 800° C.

With this configuration, for example, the glass component in the glaze can melt upon being heated in the organic substance removal step. As a result, the inorganic pigment on the heat-resistant member becomes covered with the vitreous material, and can more appropriately fix on the heat-resistant member. With the foregoing configuration, it is therefore possible to, for example, more appropriately decorate the heat-resistant member.

(Configuration 4) The method further includes: a glaze applying step of applying a glaze onto the heat-resistant member in at least a region with the drawn image after the organic substance removal step; and a glaze heating step of heating the heat-resistant member having the glaze applied thereon to a temperature equal to or greater than the melting point of the glaze.

With this configuration, for example, the glass component in the glaze applied in the glaze applying step can melt in the glaze heating step. As a result, the inorganic pigment on the heat-resistant member becomes covered with the vitreous material, and can more appropriately fix on the heat-resistant member. With the foregoing configuration, it is therefore possible to, for example, more appropriately decorate the heat-resistant member.

In the glaze heating step, for example, the heat-resistant member is heated with an oven or the like to a temperature equal to or greater than the melting point of the glaze. A temperature equal to or greater than the melting point of the glaze is, for example, about 500° C. to 1200° C., more preferably about 500° C. to 800° C. In the glaze heating step, the heat-resistant member may be heated with, for example, a kiln such as a pottery kiln.

(Configuration 5) The pasty liquid containing an organic substance is a starch paste. With this configuration, the pasty liquid in the ink can be appropriately prepared. It is also possible to, for example, more appropriately decorate the heat-resistant member.

(Configuration 6) The organic substance contained in the pasty liquid is polyvinyl alcohol. With this configuration, the pasty liquid in the ink can be appropriately prepared. It is also possible to, for example, more appropriately decorate the heat-resistant member.

(Configuration 7) A printing device for drawing an image on a heat-resistant member, the device including: an inkjet head that ejects an ink onto the heat-resistant member in droplets, the ink containing at least a pasty liquid containing an organic substance, an UV-polymerizable organic substance which is an organic substance that polymerizes upon being irradiated with UV light, and an inorganic pigment dispersed in the pasty liquid; and an UV irradiator that applies UV light onto the ink landed on the heat-resistant member, the organic substance component contained in the ink on the heat-resistant member being removed by heating the heat-resistant member having an image drawn thereon. With this configuration, for example, the same effect obtained in configuration 1 can be obtained.

(Configuration 8) An ink for use in an inkjet head of a printing device that draws an image on a heat-resistant member, the ink including: a pasty liquid containing an organic substance; an UV-polymerizable organic substance which is an organic substance that polymerizes upon being irradiated with UV light; and an inorganic pigment dispersed in the pasty liquid, the UV light being applied after the ink lands on the heat-resistant member, and the organic substance component contained in the ink on the heat-resistant member being removed by heating the heat-resistant member having an image drawn thereon. With this configuration, for example, the same effect obtained in configuration 1 can be obtained.

(Configuration 9) A method for producing a painted heat-resistant member which is a heat-resistant member having an image drawn thereon, the method including: a drawing step of ejecting an ink onto a heat-resistant member in droplets with an inkjet head, and irradiating the ink landed on the heat-resistant member with UV light to draw an image on the heat-resistant member, the ink containing at least an UV-polymerizable organic substance which is an organic substance that polymerizes upon being irradiated with UV light, and an inorganic pigment; and an organic substance removal step of heating the heat-resistant member having the image drawn thereon to remove the organic substance component contained in the ink on the heat-resistant member. In the organic substance removal step of the configuration above, for example, at least the UV-polymerizable organic substance contained in the ink is removed as the organic substance component.

With this configuration, for example, an image can be appropriately drawn on the heat-resistant member with the inkjet head in the drawing step. It is also possible to, for example, appropriately prevent bleeding by irradiating the ink with UV light as soon as the ink has landed. The inorganic pigment in the ink also can appropriately fix to the heat-resistant member upon removing the organic substance component in the ink in the organic substance removal step. With this configuration, it is possible to, for example, appropriately decorate the heat-resistant member.

(Configuration 10) A printing device for drawing an image on a heat-resistant member, the device including: an inkjet head that ejects an ink onto the heat-resistant member in droplets, the ink containing at least an UV-polymerizable organic substance which is an organic substance that polymerizes upon being irradiated with UV light, and an inorganic pigment; and an UV irradiator that applies UV light onto the ink landed on the heat-resistant member, the organic substance component contained in the ink on the heat-resistant member being removed by heating the heat-resistant member having an image drawn thereon. With this configuration, for example, the same effect obtained in configuration 9 can be obtained.

(Configuration 11) An ink for use in an inkjet head of a printing device that draws an image on a heat-resistant member, the ink including: an UV-polymerizable organic substance which is an organic substance that polymerizes upon being irradiated with UV light; and an inorganic pigment, the UV light being applied after the ink lands on the heat-resistant member, and the organic substance component contained in the ink on the heat-resistant member being removed by heating the heat-resistant member having an image drawn thereon. With this configuration, for example, the same effect obtained in configuration 9 can be obtained.

(Configuration 12) A method for producing a painted heat-resistant member which is a heat-resistant member having an image drawn thereon, the method including: a drawing step of ejecting an ink onto a heat-resistant member in droplets with an inkjet head to draw an image on the heat-resistant member, the ink containing at least an organic polymer and an inorganic pigment; and an organic substance removal step of heating the heat-resistant member having the image drawn thereon to remove the organic substance component contained in the ink on the heat-resistant member. In the organic substance removal step of the configuration above, for example, at least the organic polymer contained in the ink is removed as the organic substance component.

With this configuration, for example, an image can be appropriately drawn on the heat-resistant member with the inkjet head in the drawing step. It is also possible to, for example, appropriately prevent bleeding with the ink containing the organic polymer. The inorganic pigment in the ink also can appropriately fix to the heat-resistant member upon removing the organic substance component in the ink in the organic substance removal step. With this configuration, it is possible to, for example, appropriately decorate the heat-resistant member.

In this case, it is preferable to heat the heat-resistant member in the drawing step. With this configuration, for example, the ink viscosity can be increase upon evaporating the solvent in the ink that has landed on the heat-resistant member, and bleeding can be more appropriately prevented. A latex ink may preferably be used as the ink containing at least an organic polymer and an inorganic pigment, for example. It may be also possible to, for example, use a resin dispersed ink in which colored binder resin particles are dispersed as dispersoid in a dispersing solution.

(Configuration 13) A printing device for drawing an image on a heat-resistant member, the device including: an inkjet head that ejects an ink onto the heat-resistant member in droplets, the ink containing at least an organic polymer and an inorganic pigment, the organic substance component contained in the ink on the heat-resistant member being removed by heating the heat-resistant member having an image drawn thereon. With this configuration, for example, the same effect obtained in configuration 12 can be obtained.

(Configuration 14) An ink for use in an inkjet head of a printing device that draws an image on a heat-resistant member, the ink including: an organic polymer; and an inorganic pigment, the organic substance component contained in the ink on the heat-resistant member being removed by heating the heat-resistant member having the image drawn thereon after the ink lands on the heat-resistant member. With this configuration, for example, the same effect obtained in configuration 12 can be obtained.

Effects of the Invention

The present invention enables, for example, appropriately decorating a heat-resistant member.

BRIEF DESCRIPTION OF THE DRAWINGS

FIG. 1A shows an exemplary configuration of a printing device 10 used in the painted heat-resistant member producing method. FIG. 1B is a flowchart representing an example of the steps of the painted heat-resistant member producing method.

EMBODIMENTS OF THE INVENTION

Figure 1A:
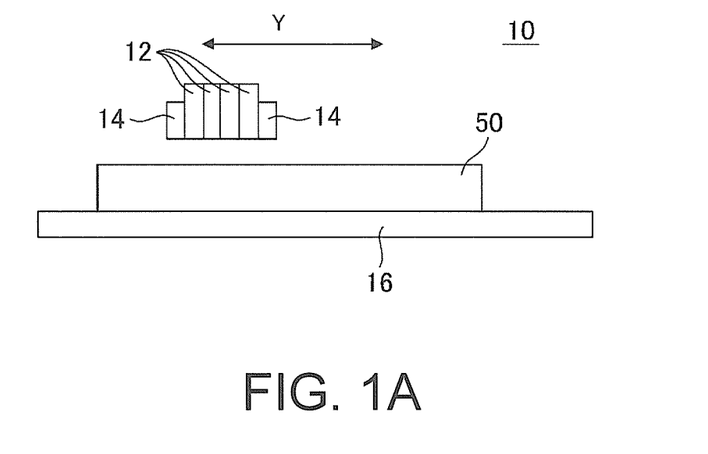
FIGS. 1A and 1B are diagrams representing an example of a painted heat-resistant member producing method according to an embodiment of the present invention.
Figure 1B:
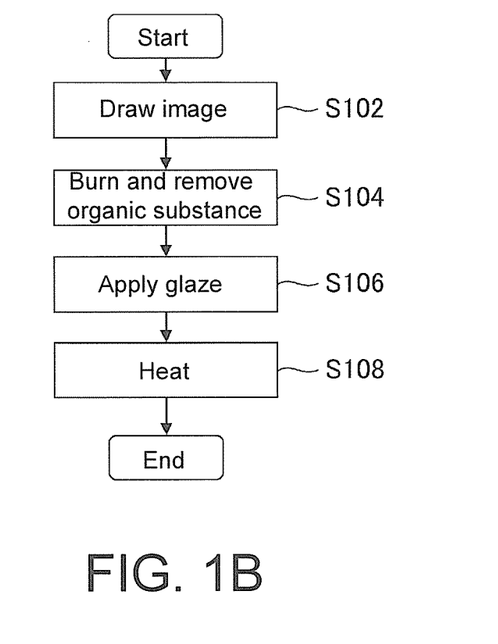

An embodiment according to the present invention is described below with reference to the accompanying drawings. FIGS. 1A and 1B represent an example of a painted heat-resistant member producing method according to an embodiment of the present invention. As used herein, "painted heat-resistant member" is, for example, a heat-resistant member with an image drawn thereon. In the this embodiment, "heat-resistant member" is, for example, a member, such as earthenware and porcelain, that can be heated to temperatures of 400° C. and more. The heat-resistant member may be, for example, any of exterior materials such as tiles, bricks, clay tiles, and stones, or pavement materials. The heat-resistant member also may be any of materials used for painting, for example, such as glass, ceramic, vitreous enamel, and cloisonné. The heat-resistant member also may be, for example, any of various heat-resistant containers and chemical-resistant containers.

FIG. 1A represents an exemplary configuration of a printing device 10 used in the painted heat-resistant member producing method. In this embodiment, the printing device 10 is an inkjet printer that prints on a medium 50 (heat-resistant member) according to the inkjet scheme, and includes a table 16, a plurality of inkjet heads 12, and an UV irradiator 14. In this embodiment, the printing device 10 is used in the drawing step of drawing an image on the medium 50 in the painted heat-resistant member producing method.

The table 16 is a platform member that holds the medium 50. In this embodiment, the medium 50 is mounted on the top surface of the table 16, and the table 16 holds the medium 50 so that the medium 50 faces the plurality of inkjet heads 12.

The inkjet heads 12 are printing heads that eject ink droplets onto the medium 50 according to the inkjet scheme. In this embodiment, the inkjet heads 12 eject inks of different colors in droplets. For example, the respective inkjet heads 12 eject inks of Y, M, C, and K, respectively.

In this embodiment, the ink ejected from each inkjet head 12 contains at least a pasty liquid containing an organic substance, an UV-polymerizable organic substance which is an organic substance that polymerizes upon being irradiated with UV light, and an inorganic pigment dispersed in the pasty liquid. The ink may further contain a component, for example, such as a polymerization initiator. Among these components, the ink contains the pasty liquid as the main component. To contain the pasty liquid as the main component means that, for example, the pasty liquid accounts for the largest proportion (weight %) of the ink. The ink may contain the pasty liquid in, for example, 50 weight % or more. The organic substance in the pasty liquid is, for example, an organic substance that makes the ink viscous.

More specifically, in this embodiment, the pasty liquid containing an organic substance is, for example, a starch paste. The pasty liquid may have a configuration other than, for example, a starch paste. For example, a pasty liquid containing polyvinyl alcohol as the organic substance is also preferred for use. The UV-polymerizable organic substance is, for example, a monomer or an oligomer that polymerizes upon being irradiated with UV light. The inorganic pigment may be, for example, any of various inorganic pigments that can be heated after the drawing step. More specifically, the inorganic pigment may preferably be, for example, the same or similar pigment contained in an underglaze color used to paint materials such as earthenware and porcelain. Preferred for use as the ink of this embodiment is, for example, an ink prepared by adding the pasty liquid and the inorganic pigment to a UV clear ink.

The UV irradiator 14 is an UV light source that applies UV light onto the ink that has landed on the medium 50. Preferred for use as the UV irradiator 14 is, for example, an UV LED (Light Emitting Diode). In this embodiment, the UV irradiator 14 applies UV light onto the ink that has landed on the medium 50 to polymerize the UV-polymerizable organic substance contained in the ink, and increase the ink viscosity to a level that prevents the ink from bleeding on the medium 50. With this configuration, it is possible to, for example, appropriately prevent the ink from bleeding on the medium 50.

In order to enable printing, the printing device 10 may further include the same or similar configurations used in known inkjet printers. The printing device 10 may be the same as or similar to, for example, a known inkjet printer, in terms of the points except for the ink. For example, in this embodiment, the printing device 10 causes the plurality of inkjet heads 12 to perform a main scan operation and a sub scan operation. In the main scan operation, the plurality of inkjet heads 12 ejects ink droplets as they move in the preset main scan direction (Y direction). In the sub scan operation, the plurality of inkjet heads 12 moves relative to the medium 50 in the sub scan direction (X direction) orthogonal to the main scan direction. By operating in this manner, the plurality of inkjet heads 12 ejects ink droplets at different locations on the medium 50. As a result of this operation, the printing device 10 draws a color image (e.g., characters, pictorial patterns, etc.) on the medium 50.

The painted heat-resistant member producing method is described below with regard to each step. FIG. 1B is a flowchart representing an example of each step of the painted heat-resistant member producing method.

The painted heat-resistant member producing method of this embodiment begins with the printing device 10 drawing a color image on the medium 50 (drawing step S102), as described above with reference to FIG. 1A. At the completion of the drawing step S102, the UV-polymerizable organic substance has polymerized, and the viscosity of the ink on the medium 50 has increased to a level that prevents the ink from bleeding. The inorganic pigment in the ink is dispersed in the pasty liquid on the medium 50.

After the drawing step S102, the medium 50 with the drawn image is heated to remove the organic substance component contained in the ink on the medium 50 (organic substance removal step S104). In this step, for example, the medium 50 is heated with an oven or the like in air at 400° C. or more (for example, about 400° C. to 500° C.). This burns and removes, for example, the organic substance component contained in the ink on the medium 50. Among the ink components, the inorganic pigment (anhydrous pigment) or the like only remains on the medium 50 after the removal of the organic substance component. Here, the inorganic pigment in the ink remains on the medium 50, for example, in a fired (sintered) state after being heated.

Thereafter, in this embodiment, a glaze is applied onto the medium 50 in at least a region in which the image has been drawn (glaze applying step S106). The glaze is, for example, a liquid containing a glass component. The glaze may be, for example, a liquid having the same or similar components as glazes used to produce, for example, earthenware and porcelain. After the glaze applying step S106, the medium 50 with the glaze applied thereon is heated with, for example, an oven or the like to a temperature at or above the melting point of the glaze (for example, about 500° C. to 1200° C., more preferably about 500° C. to 800° C.) (glaze heating step S108). In the glaze heating step S108, for example, the glass component of the glaze melts to form a glaze layer on the surface of the medium 50, and the inorganic pigment on the medium 50 becomes covered with the vitreous material. This makes it possible to, for example, appropriately fix the inorganic pigment on the medium 50. The durability and the scratch resistance of the image drawn on the medium 50 also can appropriately improve. The resistance (for example, high solvent resistance) against chemicals such as solvent also can appropriately improve. With these improvements, the image drawn on the medium 50 can have, for example, weather resistance that lasts in the order of thousand years.

As described above, in this embodiment, for example, an image can be directly drawn on the medium 50 with the plurality of inkjet heads 12 in the drawing step S102 to appropriately produce a high-resolution image. The inorganic pigment in the ink can then appropriately fix to the medium 50 by sequentially conducting the organic substance removal step S104, glaze applying step S106, and glaze heating step S108. This enables appropriately decorating the medium 50.

As described above, the ink used in this embodiment contains the pasty liquid, the UV-polymerizable organic substance, and the inorganic pigment. Here, for example, the inorganic pigment can be uniformly dispersed in the ink by being dispersed in the pasty liquid. In this embodiment, the ink containing the inorganic pigment can thus be used to appropriately draw an image, for example.

Because the ink contains the externally polymerizable organic substance, the viscosity of the ink on the medium 50 can be appropriately increased upon irradiation of the landed ink with UV light, for example, even when a low-viscosity ink that is ejectable according to the inkjet scheme is used. In this embodiment, for example, the ink can thus be appropriately prevented from bleeding upon landing. As used herein, "a low-viscosity ink that is ejectable according to the inkjet scheme" has a viscosity of, for example, less than 20 mPa·sec (25° C. room temperature). The ink landed on the medium 50 and irradiated with UV light has a viscosity of for example, 20 mPa·sec (25° C. room temperature) or more, preferably 100 mPa·sec (25° C. room temperature) or more.

When a low-viscosity ink that is ejectable according to the inkjet scheme is used, the ink tends to bleed when the ink has the same viscosity after it has landed on the medium 50. It thus appears likely that the bleeding problem occurs when a low-viscosity ink that is ejectable according to the inkjet scheme is used, and when the ink contains, for example, the pasty liquid and the inorganic pigment, but does not contain the UV-polymerizable organic substance.

On the other hand, for example, when the ink contains the UV-polymerizable organic substance and the inorganic pigment, but does not contain the pasty liquid, bleeding can be reduced by immediately irradiating the ink with UV light after it has landed, even when the ink has low viscosity. However, in this case, the ink cures before the ink dots can sufficiently spread, and the ink dots may retain granularity and produce a matte image. In this case, it may not be possible to appropriately print, for example, a glossy image.

In contrast, in this embodiment, the ink viscosity is increased by irradiating the ink with UV light after it has landed, and bleeding can be appropriately reduced. The embodiment thus enables, for example, appropriate ejection of the ink in the inkjet scheme, and prevention of bleeding at the same time. Here, the pasty liquid remains after the UV irradiation, and the ink does not completely cure even after the UV irradiation. Conceivably, this allows the ink dots to, for example, gradually spread and flatten over time. There accordingly will be no granularity remaining in ink dots and producing a matte image, for example, even when the ink is irradiated with UV light immediately after it has landed in droplets.

In this embodiment, the UV-polymerizable organic substance is used not to completely cure the ink, but to increase the ink viscosity and prevent bleeding, as described above. The content of the UV-polymerizable organic substance can thus be more appropriately reduced than when, for example, the ink is completely cured by UV irradiation. This further improves the ink safety, for example, even when substances, such as monomers, that are harmful to human body are used as the UV-polymerizable organic substance.

In this embodiment, the organic substance component of the ink is removed in the organic substance removal step S104. This eliminates the problem of residual uncured monomer or the like when substances such as monomers are used as the UV-polymerizable organic substance. Further, because the content of the UV-polymerizable organic substance can be reduced, it is unlikely that the UV-polymerizable organic substance remains, for example, even when the heating temperature (firing temperature) of the organic substance removal step S104 is low. With this embodiment, the problem of residual monomer or the like can thus be more appropriately prevented.

As described above, in this embodiment, a variety of heat-resistant members can be printed in a manner that, by taking advantage of the characteristics of the heat-resistant member, greatly improves the weather resistance of the print (ultrahigh weather-resistance 1000-year print) without causing bleeding or leaving harmful residual components such as monomers. The method also does not require additional steps such as transfer, and does not complicate the procedure. With the use of a glaze that becomes highly transparent upon being heated, for example, the image drawn on the medium 50 can have a transparent look. With these features, the painted heat-resistant member producing method of the embodiment can be suitably used for drawing on, for example, name plates, tombs, traffic signs, outdoor maps, and information maps.

Figure 2:
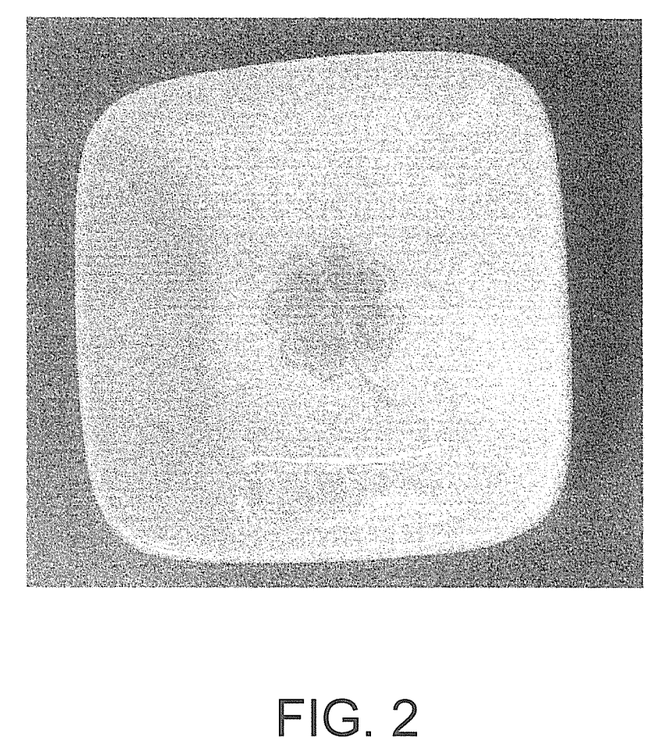
FIG. 2 is a photographic representation showing the painted heat-resistant member actually produced by using the painted heat-resistant member producing method of the embodiment.

FIG. 2 is a diagram representing an example of the painted heat-resistant member actually produced by using the painted heat-resistant member producing method of the embodiment, showing an image drawn on earthenware (an example of the heat-resistant member) using the method described in conjunction with FIGS. 1A and 1B. As shown in the diagram, a painted heat-resistant member can be appropriately produced in the embodiment.

In the painted heat-resistant member producing method of the embodiment, it may be possible to, for example, use an ink further containing a glaze in addition to the pasty liquid, the UV-polymerizable organic substance, and the inorganic pigment. In this case, the heating temperature in the organic substance removal step S104 is, for example, a temperature that is preferably at or above the melting point of the glaze.

With this configuration, for example, the inorganic pigment can appropriately fix to the medium 50 with the glaze in the organic substance removal step S104. In this case, the glaze applying step S106 and the glaze heating step S108 may be omitted, or the method may perform the glaze applying step S106 and the glaze heating step S108.

It may be possible to, for example, use inks of different configurations as may be decided according to such factors as the intended use or the accuracy of the drawn image. For example, it may be possible to use an ink that contains at least the UV-polymerizable organic substance and the inorganic pigment, but does not contain the pasty liquid.

Such an ink also can be used to, for example, appropriately draw an image on the medium 50 with the inkjet heads 12 in the drawing step S102. Bleeding also can be appropriately prevented, for example, by irradiating the ink with UV light as soon as it lands on the medium 50. The inorganic pigment in the ink also can fix to the medium 50 by sequentially conducting the organic substance removal step S104, glaze applying step S106, and glaze heating step S108. These inks can thus be also used to, for example, appropriately decorate the medium 50. It may be possible to use an ink that contains a glaze in addition to the UV-polymerizable organic substance and the inorganic pigment. In this case, for example, the heating temperature in the organic substance removal step S104 is preferably at or above the melting point of the glaze.

It may be possible to use an ink that contains at least an organic polymer and an inorganic pigment. Such an ink may be, for example, a latex ink that uses an inorganic pigment as a colorant. The latex ink is, for example, an ink containing a water-soluble polymer.

Such an ink also can be used to, for example, appropriately draw an image on the heat-resistant member medium 50 with the inkjet heads 12 in the drawing step S102. Bleeding also can be appropriately prevented with, for example, an ink containing an organic polymer. The inorganic pigment in the ink also can appropriately fix to the medium 50 upon removing the organic substance component of the ink in the organic substance removal step S104. These inks can thus be also used to, for example, appropriately decorate the medium 50.

When using a latex ink, it is preferable to heat the medium 50 in the drawing step S102. Heating may be performed with, for example, a heating means provided in the printing device 10. With this configuration, for example, the solvent in the ink landed on the medium 50 can be evaporated to increase ink viscosity, and more appropriately prevent bleeding.

The ink containing at least an organic polymer and an inorganic pigment may be an ink other than a latex ink. For example, such an ink may be a resin dispersed ink in which colored binder resin particles are dispersed as dispersoid in a dispersing solution. It also may be possible to use an ink that contains a glaze in addition to an organic polymer and an inorganic pigment. In this case, for example, the heating temperature in the organic substance removal step S104 is preferably at or above the melting point of the glaze.

Figure 3:
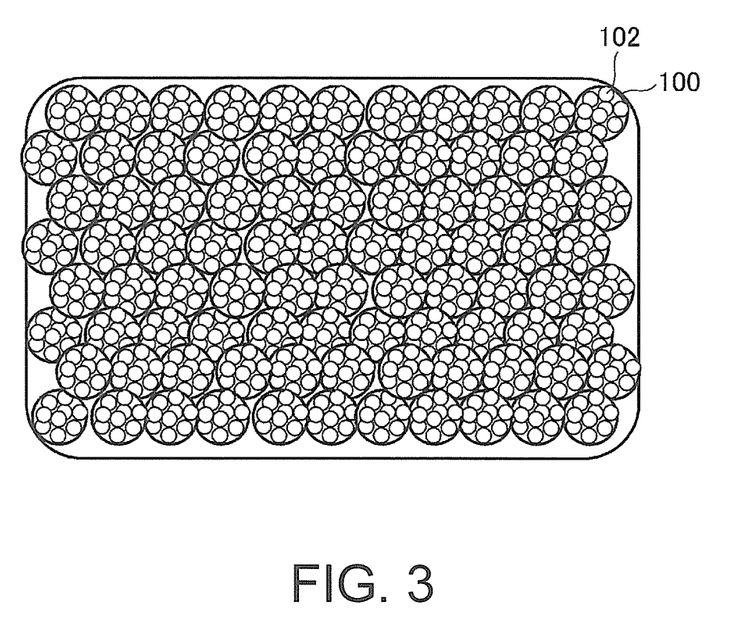
FIG. 3 is a diagram representing an exemplary configuration of a resin dispersed ink.

FIG. 3 illustrates an exemplary configuration of the resin dispersed ink. In this embodiment, the resin dispersed ink is an ink in which a binder resin 100 containing a colorant 102 is dispersed in a dispersing solution. The colorant 102 is an inorganic pigment.

Such an ink also can be used to, for example, appropriately draw an image on the heat-resistant member medium 50 with the inkjet heads 12 in the drawing step S102. Bleeding also can be appropriately prevented with, for example, an ink containing an organic polymer. The inorganic pigment in the ink also can appropriately fix to the medium 50 upon removing the organic substance component of the ink in the organic substance removal step S104. These inks can thus be also used to, for example, appropriately decorate the medium 50.

It is also preferable to heat the medium 50 in the drawing step S102 when using the resin dispersed ink. Heating may be performed with, for example, a heating means provided in the printing device 10. With this configuration, for example, the solvent in the ink landed on the medium 50 can be evaporated to increase ink viscosity, and more appropriately prevent bleeding.

The following more specifically describes the configuration of the resin dispersed ink. The binder resin 100 used in the resin dispersed ink of the embodiment is not limited to specific materials, as long as it does not dissolve in the vehicle. However, the binder resin 100 is preferably at least one selected from high-molecular compounds that polymerize and cure under light or heat, or high-molecular compounds that have polymerized and cured under light or heat. As used herein, "vehicle" in the ink of the embodiment refers to a component other than the binder resin 100 in which fine particles such as the colorant 102 are dispersed or dissolved. For example, vehicle is intended to mean a solvent (dispersing liquid), an additive, or a cosolvent.

Specifically, the material of the binder resin 100 may be a monomer, an oligomer, or a low-molecular resin that polymerizes and cures under energy rays such as UV light, electron beam, and radiation, or under heat. For example, the particles of binder resin 100 may be one formed by emulsion polymerization or suspension polymerization of the binder resin material monomer with the colorant. With this configuration, for example, the particles of binder resin 100 can easily have a substantially spherical or elliptical shape. The foregoing configuration also ensures sufficient ejection stability through the inkjet heads, for example, even when the binder resin 100 has a large particle size.

Specific examples of the binder resin 100 include a vinyl resin, an acrylic resin, an alkyd resin, a polyester resin, a urethane resin, a styrene resin, a styrene copolymer resin, a silicon resin, a fluoro resin, an epoxy resin, a phenoxy resin, a polyolefinic resin, and modified resins of these. More preferred are an acrylic resin, a polyurethane resin, a polyester resin, and an acrylic resin. Particularly preferred is an acrylic resin.

Other examples of the binder resin 100 include a natural rubber latex, a styrene butadiene latex, a styrene-acryl latex, and a polyurethane latex. Preferably, for example, these binder resins are used in undiluted form or after being reacted in emulsion polymerization. In this way, the unpolymerized low-viscosity liquid resin can easily form a spherical shape upon being dispersed in water. When using these binder resins, the binder resin may be a polymer dispersive resin that requires a dispersant, or a self dispersive resin (see JP-A-2001-152063 for reference).

The cured high-molecular compound may be, for example, any of various synthetic latexes. Examples of synthetic latexes include a natural rubber (natural rubber latex), polybutadiene (EBR latex), a styrene-butadiene copolymer (SBR latex), an acrylonitrile-butadiene copolymer (NBR latex), a methyl methacrylate-butadiene copolymer (MBR latex), a 2-vinylpyridine-styrene-butadiene copolymer (VP latex vinyl pyridine latex), polychloroprene (chloroprene latex), polyisoprene (IR latex), polystyrene (polystyrene latex), polyurethane (polyurethane latex polyurethane emulsion), an acrylate polymer (acryl latex acrylate emulsion), polyvinyl acetate (vinyl acetate emulsion), a vinyl acetate copolymer (such as vinyl acetate acryl emulsion), a vinyl acetate-ethylene copolymer (such as EVA emulsion), an acrylate-styrene copolymer (acryl styrene emulsion), polyethylene (polyethylene emulsion), a vinyl chloride copolymer (vinyl chloride latex), a vinylidene chloride copolymer (vinylidene(chloride) latex), and epoxy (epoxy emulsion). These may be used alone or in combination. In order to improve adhesion for the medium 50, or fixability at low temperatures, it may be possible to use a combination of a low glass-transition-point (TG) resin and a high TG, high rigid resin.

In the ink of the embodiment, the binder resin 100 has an average particle size of preferably 300 nm or more, more preferably 400 nm or more. The average particle size of the binder resin 100 is the average particle size of the binder resin 100 particles dispersed in a dispersing solution. With this configuration, for example, it is possible to appropriately prevent problems such as bleeding of the ink on the medium 50, aggregation of binder resin particles, and alteration of the colorant while ensuring sufficient ejection stability through the inkjet heads. The binder resin particles may have an average particle size of, for example, 800 nm or more. With this configuration, for example, bleeding on the ink on the medium 50 can be more reliably prevented. Preferably, the average particle size of the binder resin 100 is 1/10 or less of the nozzle diameter of the inkjet head nozzle. With this configuration, for example, ejection stability can more appropriately improve. Preferably, the binder resin 100 particles are substantially spherical, elliptical, or discotic in shape. With this configuration, for example, the ejection stability of the ink can more appropriately improve.

The concentration of the binder resin 100 particles in the ink may be appropriately set according to the intended purpose. For example, when pigment fine particles are dispersed as colorant 102 in the particles of binder resin 100, the binder resin 100 is preferably 5 volume % to 70 volume %, more preferably 7 volume % to 40 volume % of the total ink amount.

The colorant 102 dispersed in the binder resin 100 particles is not particularly limited, as long as it is an inorganic pigment that does not dissolve in the vehicle. The colorant 102 may be selected from a range of inorganic pigments according to the intended purpose. Specifically, the colorant 102 may be at least one inorganic pigment selected from the group including titanium oxide, magnetic particles, alumina, silica, ceramics, carbon black, metal nanoparticles, and organic metals. Examples of the material for the metal nanoparticles include gold, silver, copper, and aluminum. An ink using titanium oxide can preferably be used as white paint.

The colorant 102 has an average particle size of preferably 500 nm or less. With this configuration, for example, the ink color improves, and enables high-definition printing. Because the colorant 102 is contained in the binder resin particles, the lightfastness of the ink can appropriately improve even when the colorant has an average particle size of 500 nm or less, or as small as, for example, about 50 nm or less. The average particle size of the colorant 102 is more preferably 200 nm or less.

The colorant 102 may be formed into particles of the foregoing particle sizes, or fine particles of colorant 102 may be produced, by using a method appropriately selected according to the type of colorant or the intended use from, for example, mechanical pulverization methods such as methods using a roll crusher, a ball mill, a jet mill, a sand grinder mill, or an edge runner; crystal precipitation methods such as crystallization in water, a hydrothermal method, and pyrolysis; vapor phase methods such as CVD (chemical vapor deposition); and liquid phase methods such as emulsion polymerization. Fine particles with a certain particle size distribution can be obtained by controlling particles within a certain particle size distribution during production, or by classifying particles of a wide particle size distribution range after the production.

In the ink of the embodiment, for example, a plurality of colorant 102 particles is dispersed in the particles of binder resin 100. Specifically, it is preferable to disperse, for example, 5 or more particles of colorant 102. The colorant 102 dispersed in the binder resin 100 particles may be of the same kind or different kind. The average proportions of the binder resin 100 and the colorant 102 in the binder resin 100 particles are preferably 20:80 to 95:5 in terms of a weight ratio. With this configuration, for example, sedimentation of the binder resin particles can be more appropriately reduced. The average proportions are more preferably 75:25 to 95:5, further preferably 65:35 to 85:15.

The solvent is not particularly limited, as long as it does not dissolve the colorant 102. The solvent can be selected from a wide range of dispersing solutions according to the intended purpose. Specific examples of the dispersing solutions include water. Water is safe to use, and, with its environmental friendliness, can preferably be used in applications such as in inks for common inkjet printers. It is preferable to add a moisturizer to water because water, when used alone, dries quickly, and causes clogging of inkjet head nozzles. When evaporating the dispersing solution on medium 50 by heating, it is also preferable to add an organic solvent to water to prevent ink bleeding. It may be possible to use a hydrophilic solvent other than water as the dispersing solution.

When the main component of the dispersing solution is at least one of water and a hydrophilic solvent, it is preferable to subject the binder resin 100 to a hydrophilic surface treatment. With this configuration, the particle surface of the binder resin 100 that contacts water or hydrophilic solvent has an affinity to water or hydrophilic solvent, and the binder resin particles desirably become dispersed in the dispersing solution. With this configuration, for example, the ink does not separate in the nozzle even when the binder resin 100 has a large particle size, and can be reliably ejected through the nozzle in predetermined amounts. The affinity to the dispersing solution occurs at the hydrophilic binder resin surface. It is accordingly not required to select hydrophilic materials for the binder resin 100 and the colorant 102, and the binder resin 100 and the colorant 102 can be selected from a wide range of materials.

Preferably, the hydrophilic treatment is performed by, for example, an emulsification treatment that emulsifies the surface with an emulsifier, or a treatment that introduces a hydrophilic group to the surface. With this configuration, for example, the particle surface of the binder resin 100 can be appropriately rendered hydrophilic.

The ink of the embodiment may contain an additive, in addition to the binder resin 100 particles containing the colorant 102, and the dispersing solution. The additive may be appropriately selected according to the intended purpose. Examples of additives include surfactants, coupling agents, buffers, biocides, sequestrants, viscosity adjusters, and solvents. The additive may be dispersed in the binder resin 100 particles, or may be contained in the dispersing solution, outside of the binder resin 100 particles.

In the ink of the embodiment, a resin different from the binder resin 100 may be dissolved in the dispersing solution.

With this configuration, for example, the ink viscosity can be more appropriately adjusted. Such an additional resin also can serve as a binder, and strongly binds the binder resins 100 to each other when the ink dries and the binder resins bind each other and form a coating, for example, upon drying the ink on the medium 50. This makes it possible to more appropriately fix the ink on the medium 50.

While there has been described a certain embodiment of the invention, the technical scope of the invention is not limited to the embodiment described above. It will be apparent to a skilled person that various modifications and improvements may be made thereto, and it is intended that the appended claim cover all such modifications and improvements as fall within the technical scope of the invention.

INDUSTRIAL APPLICABILITY

The present invention is suitable for use, for example, as a method to produce a painted heat-resistant member.

The invention claimed is:

1. A method for producing a painted heat-resistant member which is a heat-resistant member having an image drawn thereon, the method comprising:
   a drawing step of ejecting an ink onto a heat-resistant member in droplets with an inkjet head to draw an image on the heat-resistant member, the ink containing at least an organic polymer as a binder resin and an inorganic pigment as a colorant, and the binder resin does not dissolve in a vehicle encapsulating the inorganic pigment as the colorant; and
   an organic substance removal step of heating the heat-resistant member having the image drawn thereon to remove the organic substance component contained in the ink on the heat-resistant member.

2. The method for producing a painted heat-resistant member according to claim 1, wherein, in the drawing step, the ink containing at least the organic polymer and an UV-polymerizable organic substance which is an organic substance that polymerizes upon being irradiated with UV light and irradiating the ink landed on the heat-resistant member with UV light to draw the image on the heat-resistant member.

3. The method for producing a painted heat-resistant member according to claim 1, wherein in the drawing step, the ink containing a pasty liquid containing an organic substance and the inorganic pigment dispersed in the pasty liquid, and the drawing step is performed while the heat-resistant member is heated.

4. The method for producing a painted heat-resistant member according to claim 3, wherein, in the drawing step, the ink landed on the heat-resistant member is irradiated with UV light to polymerize the UV-polymerizable organic substance, and the viscosity of the ink is increased to a level that prevents the ink from bleeding on the heat-resistant member.

5. The method for producing a painted heat-resistant member according to claim 3, wherein the ink further contains a glaze, and
   wherein the organic substance removal step heats the heat-resistant member to a temperature equal to or greater than a melting point of the glaze.

6. The method for producing a painted heat-resistant member according to claim 3, further comprising:
   a glaze applying step of applying a glaze onto the heat-resistant member in at least a region with the drawn image after the organic substance removal step; and
   a glaze heating step of heating the heat-resistant member having the glaze applied thereon to a temperature equal to or greater than a melting point of the glaze.

7. The method for producing a painted heat-resistant member according to claim 3, wherein the pasty liquid containing an organic substance is a starch paste.

8. The method for producing a painted heat-resistant member according to claim 3, wherein the organic substance contained in the pasty liquid is polyvinyl alcohol.

9. A printing device for drawing an image on a heat-resistant member, the printing device comprising:
   an inkjet head that ejects an ink onto the heat-resistant member in droplets, the ink containing at least an organic polymer as a binder resin and an inorganic pigment as a colorant, and the binder resin does not dissolve in a vehicle encapsulating the inorganic pigment as the colorant,
   the organic substance component contained in the ink on the heat-resistant member being removed by heating the heat-resistant member having an image drawn thereon.

10. The printing device for drawing an image on a heat-resistant member according to claim 9, the printing device further comprising:
    an UV irradiator that applied UV light onto the ink landed on the heat-resistant member,
    wherein the ink containing an UV-polymerizable organic substance which is an organic substance that polymerizes upon being irradiated with UV light.

11. The printing device for drawing an image on a heat-resistant member according to claim 10, wherein the ink containing a pasty liquid containing an organic substance and the inorganic pigment dispersed in the pasty liquid.

12. An ink for use in an inkjet head of a printing device that draws an image on a heat-resistant member, the ink comprising:
    an organic polymer as a binder resin; and
    an inorganic pigment as a colorant, and the binder resin does not dissolve in a vehicle encapsulating the inorganic pigment as the colorant;
    the organic substance component contained in the ink on the heat-resistant member being removed by heating the heat-resistant member having the image drawn thereon after the ink lands on the heat-resistant member.

13. The ink for use in an inkjet head of a printing device that draws an image on a heat-resistant member according to claim 12, wherein
    the organic polymer is an UV-polymerizable organic substance which is an organic substance that polymerizes upon being irradiated with UV light and the organic substance component contained in the ink on the heat-resistant member being removed by applying the UV light after the ink lands on the heat-resistant member and heating the heat-resistant member having an image drawn thereon.

14. The ink for use in an inkjet head of a printing device that draws an image on a heat-resistant member according to claim 13, wherein
    the ink containing a pasty liquid containing an organic substance and the inorganic pigment dispersed in the pasty liquid.

* * * * *